United States Patent [19]

Inoue et al.

[11] Patent Number: 6,002,836
[45] Date of Patent: Dec. 14, 1999

[54] RECORDING AND REPRODUCING APPARATUS IN WHICH DIGITAL DATA HAVING VARIOUS TRANSMISSION RATES ARE PROCESSED AT THEIR OPTIMUM DATA RATES

[75] Inventors: Hajime Inoue; Hisato Shima, both of Chiba; Keiji Kanota; Yukio Kubota, both of Kanagawa; Akira Shimazu, Tokyo, all of Japan

[73] Assignee: Sony Corporation, Tokyo, Japan

[21] Appl. No.: 08/710,974

[22] Filed: Sep. 24, 1996

Related U.S. Application Data

[63] Continuation of application No. 08/379,620, Jan. 31, 1995, abandoned.

[30] Foreign Application Priority Data

Jun. 7, 1993 [JP] Japan ..................................... 5-163200
Mar. 7, 1994 [JP] Japan ..................................... 6-062027
Jun. 7, 1994 [WO] WIPO ....................... PCT/JP94/00914

[51] Int. Cl.$^6$ ............................. G11B 15/46; G11B 5/09; H04N 5/91; H04N 5/926
[52] U.S. Cl. .............................. 386/95; 386/124; 360/53; 360/73.08
[58] Field of Search ........................ 360/33.1, 53, 73.02, 360/73.03, 73.08, 10.1; 386/6, 7, 37, 67, 80, 81, 123, 46, 117, 1, 35, 95, 96, 107–109, 111–112, 124

[56] References Cited

U.S. PATENT DOCUMENTS

| | | | |
|---|---|---|---|
| 4,488,185 | 12/1984 | Toba | 386/52 |
| 5,142,422 | 8/1992 | Zook et al. | 360/53 X |
| 5,170,388 | 12/1992 | Endoh | 360/33.1 X |
| 5,231,543 | 7/1993 | Kubota et al. | 360/73.08 X |
| 5,303,095 | 4/1994 | Voung | 360/73.08 X |
| 5,319,501 | 6/1994 | Mitsuhashi | 386/101 |
| 5,406,428 | 4/1995 | Suzuki | 360/53 |
| 5,477,399 | 12/1995 | Honjo et al. | 360/73.05 |
| 5,671,095 | 9/1997 | Arai et al. | 360/8 |

OTHER PUBLICATIONS

*Database WPI*, Section EI, Week 9224, Derwent Publications Ltd., London, GB; Class T03, AN 92-200396 and WO-A-92 09074 (abstract) of May 29 1992.
*Patent Abstracts of Japan*, vol. 17, No. 408, (P-1582) of Jul. 29 1993 and JP-A-05 073 864 (abstract) of Mar. 26 1993.
*Database WPI*, Section EI, Week 9445, Derwent Publications Ltd., London, GB; Class W04, AN 94-359961 and EP-A-0 625 850 (abstract) of Nov. 23 1994.
*Database WPI*, Section EI, Week 9505, Derwent Publications Ltd., London, GB; Class T03, AN 95-036768 and WO-A-29 858 (abstract) of Dec. 22 1994.

*Primary Examiner*—Aristotelis M. Psitos
*Assistant Examiner*—Regina Y. Neal
*Attorney, Agent, or Firm*—Frommer, Lawrence & Haug, LLP.; William S. Frommer

[57] ABSTRACT

A recording and reproducing apparatus according to the invention has: at least a pair of rotary heads having different azimuth angles; a run controller for controlling the run of the magnetic tape; and a recording timing controller for controlling so that the recording by the rotary heads is performed at the first period when digital data having a first data rate is inputted, wherein the digital data is recorded on the magnetic tape at a recording timing. The recording and reproducing apparatus also has a memory for storing the digital data which is supplied from the outside, a reader for reading the digital data stored in the memory, and a signal processor for executing a predetermined process to the digital data read from the memory. When digital data having a second data rate which is different from the first data rate is inputted, the recording timing controller and the reader execute respective processes at an operating speed based on the ratio of those rates and the run controller controls the speed of the magnetic tape based on the data rate ratio.

14 Claims, 18 Drawing Sheets

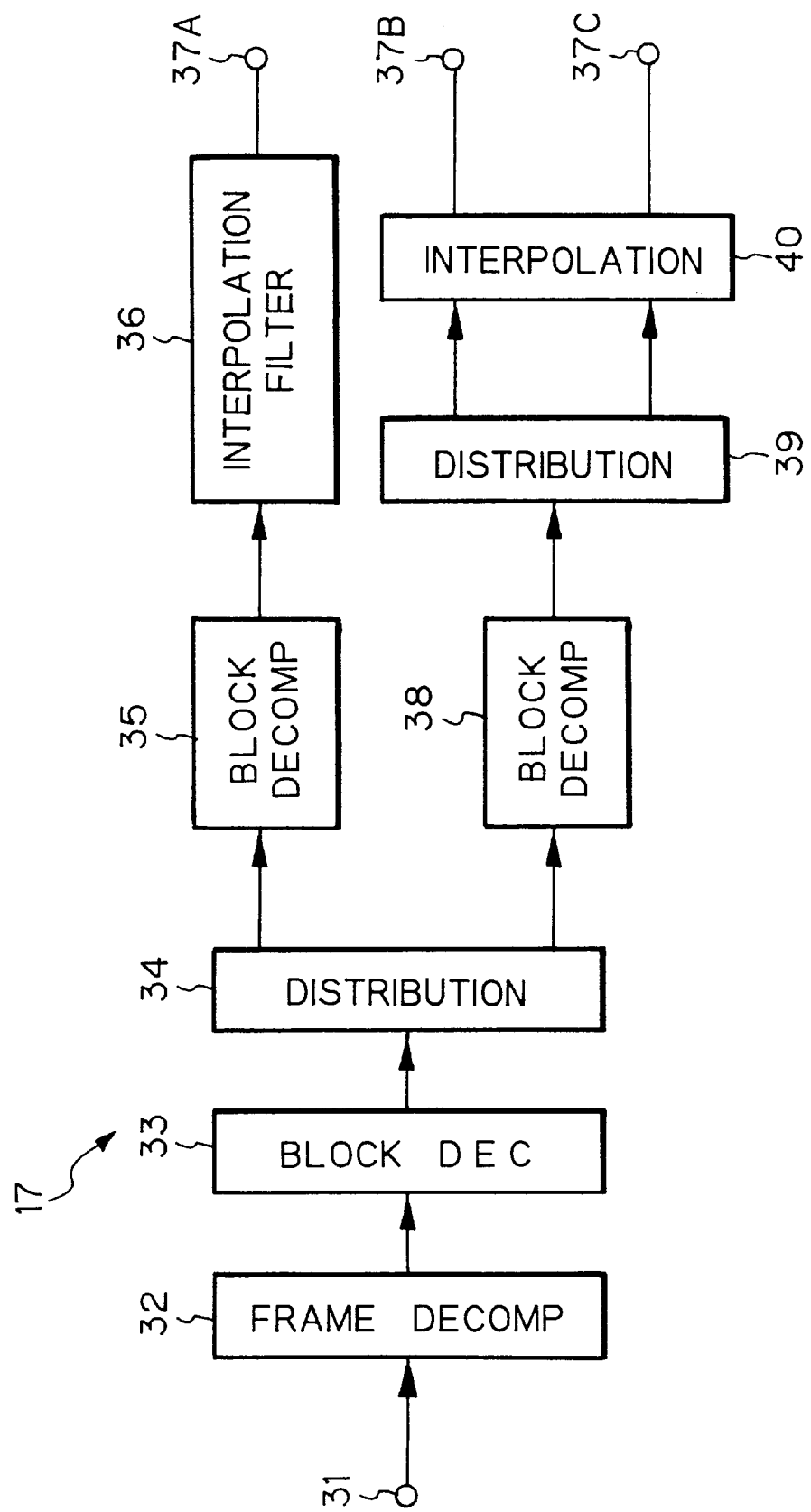

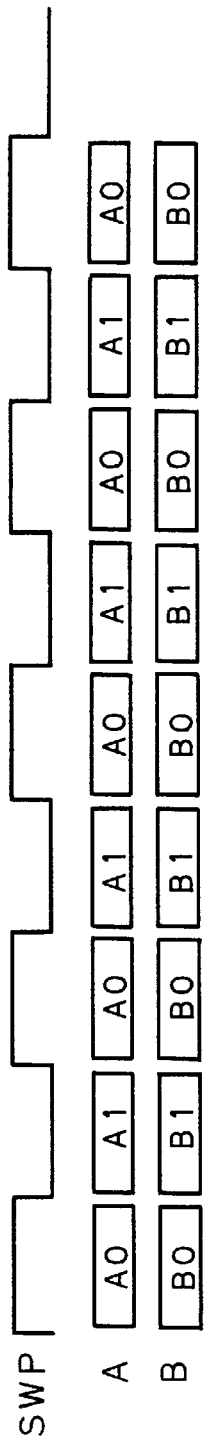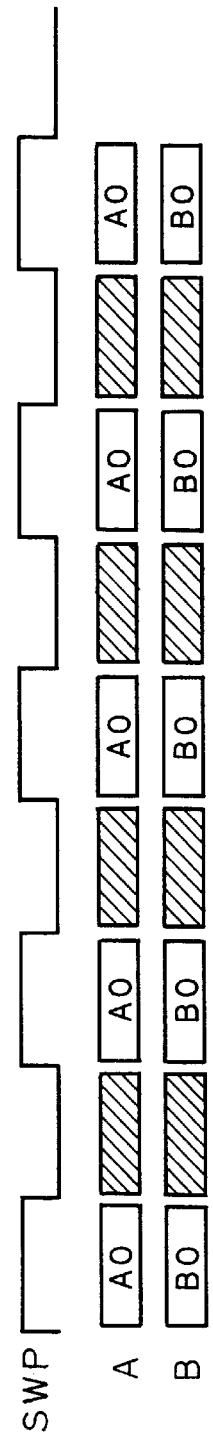
Fig. 7A SWP
Fig. 7B A
Fig. 7C B
Fig. 8A SWP
Fig. 8B A
Fig. 8C B

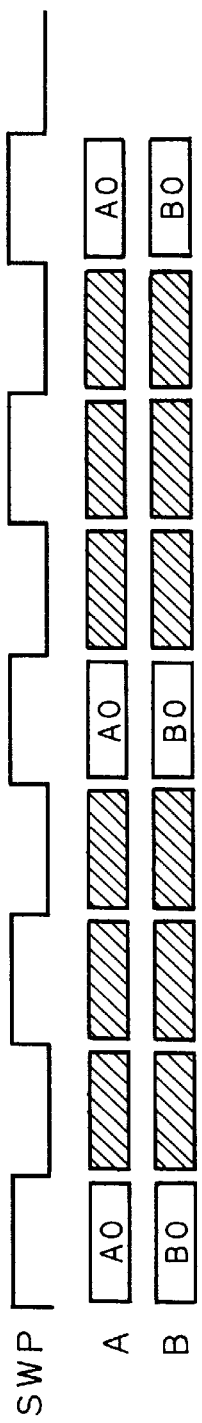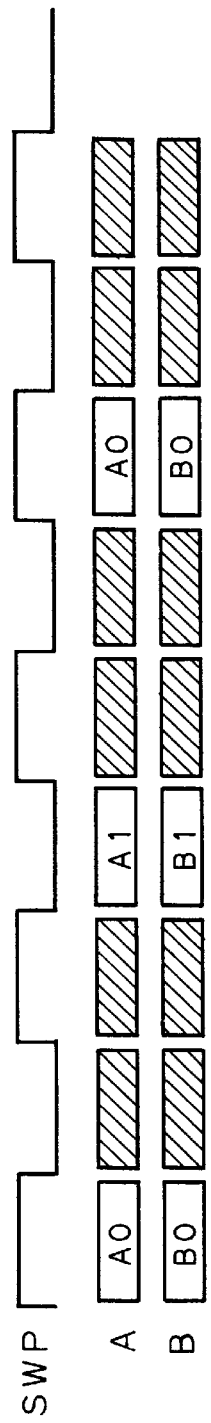
Fig. 9A
Fig. 9B
Fig. 9C
Fig. 10A
Fig. 10B
Fig. 10C

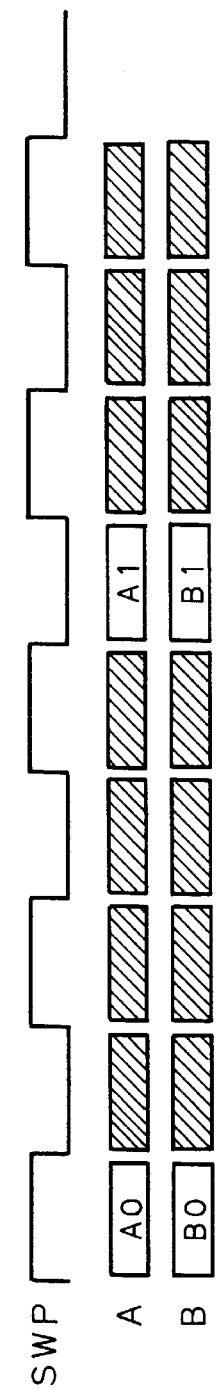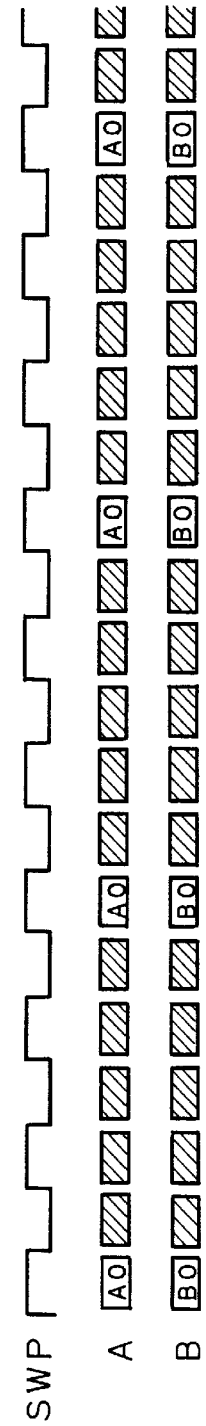
Fig.11A
Fig.11B
Fig.11C
Fig.12A
Fig.12B
Fig.12C

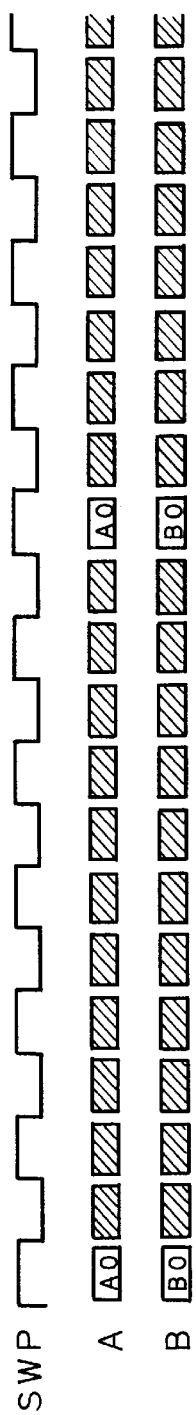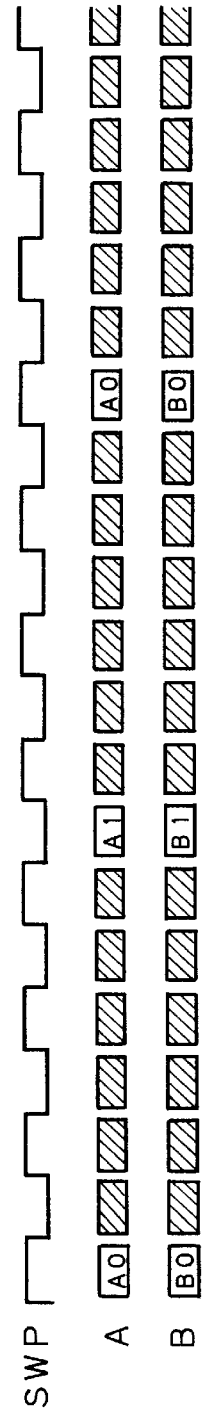
Fig. 13A SWP
Fig. 13B A
Fig. 13C B
Fig. 14A SWP
Fig. 14B A
Fig. 14C B

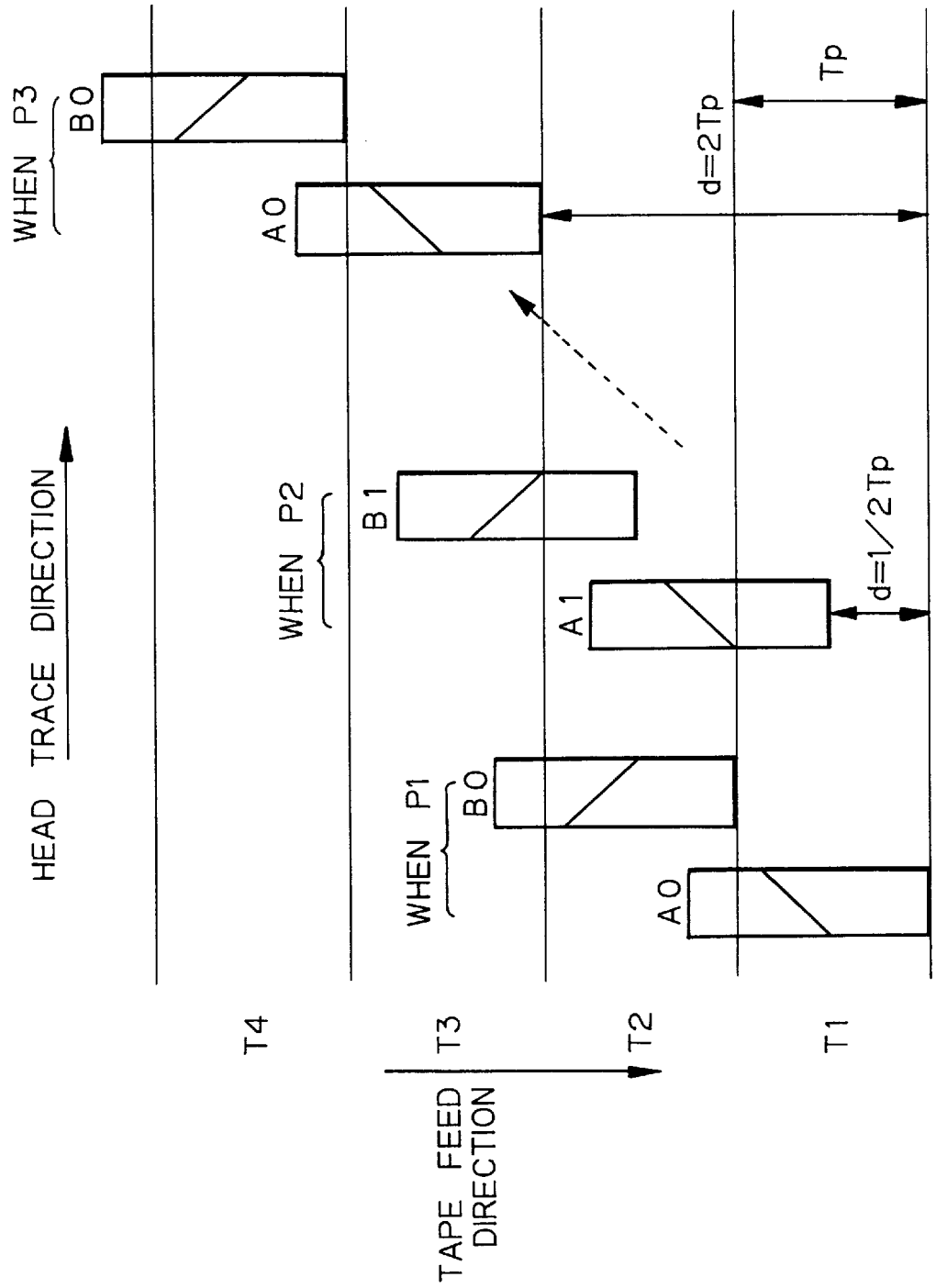

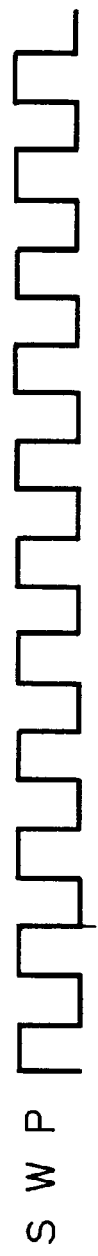
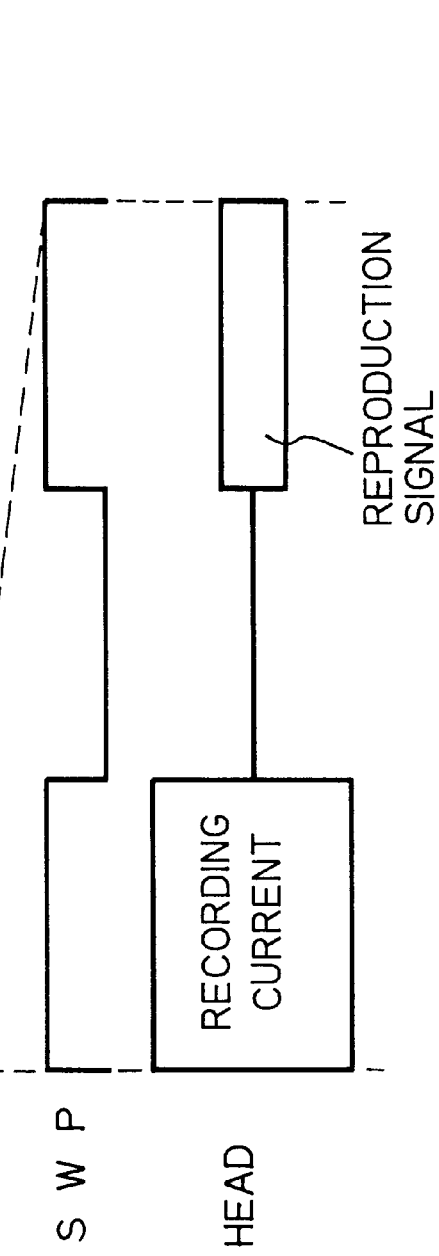
Fig. 19A
Fig. 19B
Fig. 19C
Fig. 19D
Fig. 19E

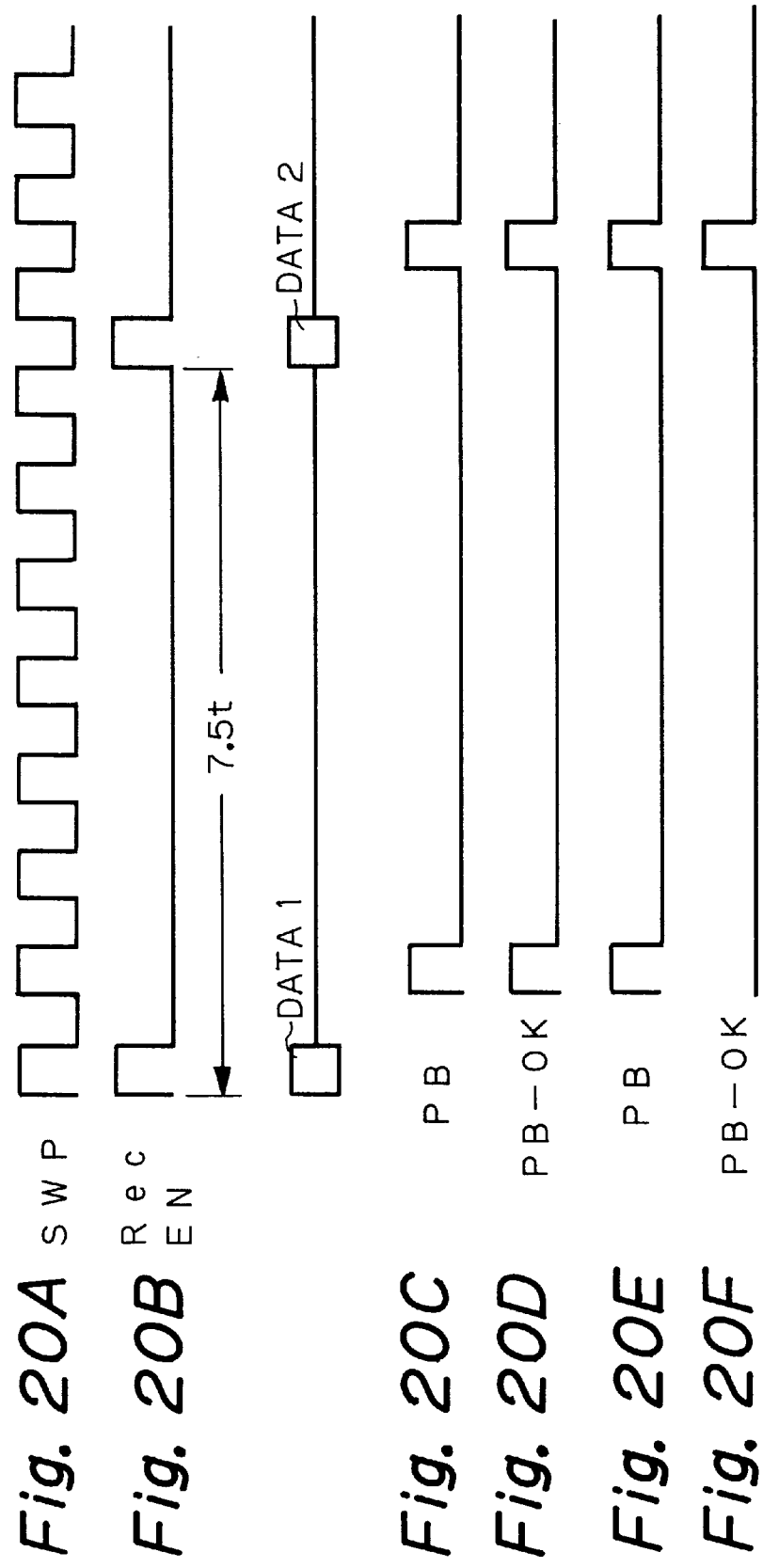

| | |
|---|---|
| 7, 8: | INTERFACE |
| 16: | EXPANDING CIRUIT |
| 17: | COMPRESSING CIRCUIT |
| 22: | EFFECTIVE INFORMATION EXTRACTING CIRCUIT |
| 25: | SYNTHESIZING CIRCUIT |

RECORDING AND REPRODUCING APPARATUS IN WHICH DIGITAL DATA HAVING VARIOUS TRANSMISSION RATES ARE PROCESSED AT THEIR OPTIMUM DATA RATES

This application is a continuation of application Ser. No. 08/379,620, filed Jan. 31, 1995, now abandoned.

TECHNICAL FIELD

The present invention relates to a recording and reproducing apparatus which can efficiently record digital data supplied and can verify whether the recorded digital data has been correctly recorded or not.

BACKGROUND ART

A digital recording and reproducing apparatus for recording transmitted digital image data and digital audio data onto a recording medium such as a magnetic tape or the like and for reproducing the digital data recorded on the recording medium has been known.

An example of a block diagram of such a digital recording and reproducing apparatus is shown in FIG. 1. In FIG. 1, in a recording system of digital data, digital data transmitted via an input terminal 101 is subjected to a predetermined process in a recording processing circuit 102. A parity having a product code construction generated by a parity generating circuit 103 is added to output data of the recording processing circuit 102. In a sync and ID generating circuit 104, a sync code and an ID are added to the data to which the parity was added. Output data of the sync and ID generating circuit 104 is subjected to a parallel/serial conversion and a conversion to a recording code in a channel encoder 105. After the data is amplified by an amplifier 106, the data is recorded on a magnetic tape 109 through a recording side terminal R of a switch 107 and a magnetic head 108.

In a reproduction system of image data and audio data in a digital recording and reproducing apparatus, the recording data recorded on the magnetic tape 109 is supplied to an amplifier and equalizer 110 through the magnetic head 108 and a reproducing side terminal (P) of the switch 107 and is subjected to an amplification and a correction of frequency characteristics. Output data of the amplifier and equalizer 110 is subjected to a decoding of a recording code and a serial/parallel conversion in a channel decoder 111 and is supplied to a sync and ID detecting circuit 112. In the sync and ID detecting circuit 112, a sync code and the ID in the data are detected and supplied to a TBC (Time Base Corrector) circuit 113 together with the reproduction data. In the TBC circuit 113, a time base fluctuation for the data is eliminated. Output data of the TBC circuit 113 is subjected to an error correcting process using a product code in an ECC circuit 114 and, after that, the data is supplied to an output terminal 116 through a reproduction processing circuit 115.

A tape format of the digital recording and reproducing apparatus has, for example, a construction as shown in FIG. 2. That is, from the scanning direction (left edge) of a head (not shown) of the digital recording and reproducing apparatus, the tape format is constructed in accordance with the order of a margin area 1, an ATF and timing sync area, an IBG (inter block gap) area 1, an audio data area, an IBG area 2, a video data area, an IBG area 3, a subcode area, and a margin area 2. The ATF and timing sync area is an area in which data for tracking and data to obtain a synchronization when after-recording are recorded. Between the above-mentioned areas, an amble area is inserted.

IBG is provided as an area to assure a margin for after-recording. Data is not recorded in the IBG. For example, a pulse signal of a frequency which is equal to a bit frequency of the recording data is recorded in each amble area. The pulse signal is used to lock a PLL circuit for a bit clock extraction provided on the reproduction side. Margin 1 and margin 2 are areas to cope with a case where a forming position of the track changes by a jitter.

The magnetic tape for the digital recording and reproducing apparatus is scanned by heads shown in FIGS. 3A, 3B and 3C. According to the heads shown in FIG. 3A, four heads in which a head A1 and a head B0 face each other and a head B1 and a head A0 correspond to each other are attached to a drum (D). According to the head shown in FIG. 3B, magnetic heads A0 and B0 are attached to a rotary drum (D) in a manner such that the magnetic head A0 faces the magnetic head B0 by 180°. The head shown in FIG. 3C relates to an example in which the magnetic heads A0 and B0 are attached to the rotary drum (D) so as to be arranged at extremely near positions. Such a magnetic head is integratedly constructed and is called a double azimuth head.

Although not shown, the magnetic tape is wound around the peripheral surface of the drum (D) with a wrap angle which is slightly larger than 180° and is fed at a constant speed. A digital video signal is sequentially recorded as an oblique track on the magnetic tape by the magnetic heads A0 and B0. In order to suppress the crosstalk between the neighboring tracks, an extending direction of the gap between the magnetic heads A0 and A1 and an extending direction of the gap between the heads B0 and B1 are made different by a predetermined angle. Thus, the crosstalk between the neighboring tracks can be reduced by the azimuth loss which occurs when reproducing.

When the drum (D) is rotated 9000 times per one minute and the magnetic tape is run at a standard speed (for example, 18.8 mm/sec), the data is recorded at a predetermined position on the tape by the heads. For the recording of the video data of one frame, for instance, 10 tracks are allocated.

For a video data area on the magnetic tape, the video data is recorded at a recording rate of 24.948 Mbps in the normal recording mode (hereinafter, referred to as an SD mode). When the recording is performed in a variable speed recording mode, for example, at a speed which is two times as high as that of the normal recording mode (hereinafter, referred to as an HD mode), data is recorded at a recording rate of 49.896 Mbps. The recording (long-time mode) at a recording data rate (12.474 Mbps) which is ½ of the data rate of the recording used in the SD mode is also considered. Further, a digital recording and reproducing apparatus for recording data compressed to various data rates in a range from about 1 Mbps to 10 Mbps is also considered.

When the video data which is supplied at a different data rate, for example, the video data of 5 Mbps is recorded at a recording rate of the above-mentioned long-time mode, superfluous data is recorded in the video data area of about 7.5 Mbps (12.474 Mbps-5 Mbps). That is, although the video data of 12.474 Mbps can be inherently recorded in the video data area, only the data area that is equal to or less than the half of the video data area is actually used. By recording superfluous data, the recordable time of the magnetic tape is reduced.

In case of recording general data (discontinuous data such as a computer program or the like) in which errors cannot be corrected with respect to the space or time, it is necessary to verify whether the correct recording has been performed or not. An exclusive-use head other than the recording head is needed for the above verification, so that problems of a complication of a head construction and an increase in costs occur.

The invention is made in consideration of the problems as mentioned above and an object of the invention is, therefore, to provide a recording and reproducing apparatus in which digital video data, computer data, and general data (shopping data, newspaper data, or the like) which is digitally transmitted can be recorded at an optimum data rate, so that the recordable time can be increased.

Another object of the invention is to provide a recording and reproducing apparatus in which when data at a low rate is intermittently recorded, whether the immediately preceding recording has correctly been performed or not can be verified without requiring a special head.

DISCLOSURE OF INVENTION

According to the invention, there is provided a recording and reproducing apparatus for recording digital data on a magnetic tape at a recording timing, comprising: at least a pair of rotary heads having different azimuth angles; run control means for controlling the run of the magnetic tape; recording timing control means for controlling so that the recording by the rotary heads is performed at the first period when digital data having a first data rate is inputted, wherein the apparatus is characterized in that the apparatus includes memory means for once storing the digital data which is supplied from the outside, reading means for reading out the digital data stored in the memory means, and signal processing means for executing a predetermined process to the digital data read out from the memory means, and that when digital data having a second data rate which is different from the first data rate is inputted, the recording timing control means and the reading means execute respective processes at an operating speed based on the ratio of the first data rate and the second data rate and the run control means controls a speed of the magnetic tape at a tape running speed based on the data rate ratio.

According to the invention, there is provided a recording and reproducing method whereby in the case where digital data having a first data rate is inputted, the recording by at least a pair of rotary heads having different azimuth angle is controlled at a recording timing so as to be executed at a first period and the run of a magnetic tape is controlled so as to record the digital data onto a magnetic tape at the recording timing, characterized by comprising the steps of:

temporarily storing the digital data which is supplied from the outside;

reading out the stored digital data;

executing a predetermined process to the digital data read out; and when digital data having a second data rate which is different from the first data rate is inputted, executing the control of the recording timing and a reading process at an operating speed based on a ratio of the first data rate and the second data rate and controlling the speed of the magnetic tape at a tape running speed based on the ratio of the first data rate and the second data rate.

BRIEF DESCRIPTION OF DRAWINGS

FIG. 6 is a detailed block diagram of an expanding circuit;

FIGS. 7A to 14C are diagrams showing recording methods of data onto a magnetic tape;

FIG. 15 is a diagram showing a positional relation between the magnetic heads and the tracks of the magnetic tape;

FIGS. 19A, 19B, 19C, 19D and 19E are timing charts for explaining the intermittent recording operation;

FIGS. 20A, 20B, 20C, 20D, 20E and 20F are timing charts regarding the verification of the recording operation;

BEST MODE FOR CARRYING OUT THE INVENTION

Figure 4:
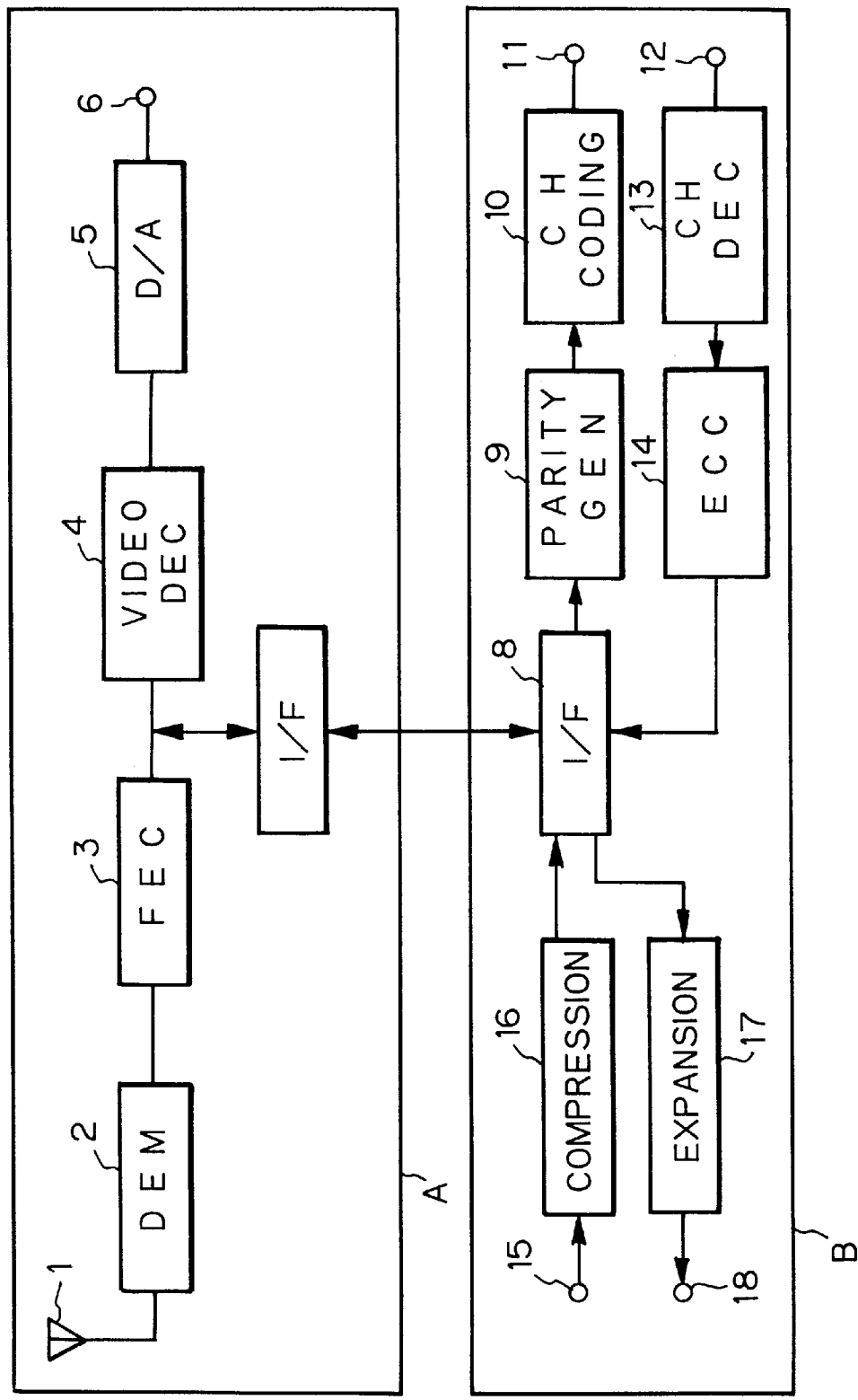
FIG. 4 is a block diagram of a digital recording and reproducing apparatus according to the invention.

An embodiment of the invention will now be explained hereinbelow with reference to the drawings. In FIG. 4, a block diagram in the case where the digital recording and reproducing apparatus according to the invention is connected to a digital television is shown. In FIG. 4, a block shown by (A) denotes a digital television and a signal compressed by MPEG or the like is received by an antenna 1. Digital video data and audio data obtained from the antenna 1 are supplied to a demodulator 2, by which a base band in the data is demodulated. Output data of the demodulator 2 is supplied to an FEC (Forward Error Correction) circuit 3. In the FEC circuit 3, errors in the data which have occurred on a transmission path are corrected. Output data of the FEC circuit 3 is expanded in a video decoder 4 and decoded to image data. The image data which is outputted from the video decoder 4 is D/A converted by a D/A converter 5. After that, the converted data is supplied to a video output terminal 6 and is supplied to a monitor (not shown) as analog image data.

When the data inputted through the antenna 1 is recorded to a digital recording and reproducing apparatus shown in (B), the output of the FEC circuit 3 is supplied to an interface 7. The data is converted to a protocol of a digital interface in the interface 7. For example, a buffer (not shown) is provided for the interface 7. The output of the FEC circuit 3 is temporarily stored by the buffer and is supplied to a buffer (not shown) of an interface 8 of the digital recording and reproducing apparatus at a predetermined output timing. The data supplied to the interface 8 is converted to the data train which is suitable for recording and, after that, the data is supplied to a parity generator 9. The data to which a parity necessary for correction of errors which occur upon recording and reproducing was added by the parity generator 9 is modulated by a channel encoder 10 and is recorded on a magnetic tape (not shown) through from a terminal 11 through a recording amplifier and heads.

When the data recorded as mentioned above is reproduced, the data transmitted through the magnetic heads and a reproducing amplifier (not shown) is supplied to a terminal 12. The reproduction data derived through the terminal 12 is demodulated by a channel decoder 13. In an ECC circuit 14, the errors which occurred upon recording and reproducing are corrected for the output data of the channel decoder 13. An output of the ECC circuit 14 is supplied to the video decoder 4 through the interfaces 8 and 7. In the video decoder 4, processes similar to those mentioned above are executed for the supplied data. After the data was converted to the analog image data by the D/A converter 5, the data is supplied to the video output terminal 6.

In the digital recording and reproducing apparatus according to the invention, there is a case such that present image data is inputted from a video camera (not shown) or the like in addition to the digital data compressed by MPEG or the like as mentioned above. Analog data of the present television system can be inputted from the antenna 1. For example, the analog data inputted from the video camera is supplied to a compressing circuit 16 through a terminal 15. The data compressed by the compressing circuit 16 is transmitted to a recording amplifier through the interface 8, parity generator 9, and channel encoder 10. In case of reproducing the data of the video camera recorded on the tape, the data outputted from the reproducing amplifier is supplied to an expanding circuit 17 through the channel decoder 13, ECC circuit 14, and interface 8. The data to which a predetermined process was executed by the expanding circuit 17 is supplied to the video output terminal 6 through the terminal 18.

In the case where a data rate of the data in the output of the interface 7 in FIG. 4 is lower than a data rate of the digital recording and reproducing apparatus, the data can be recorded by using the digital recording and reproducing apparatus.

Figure 5:
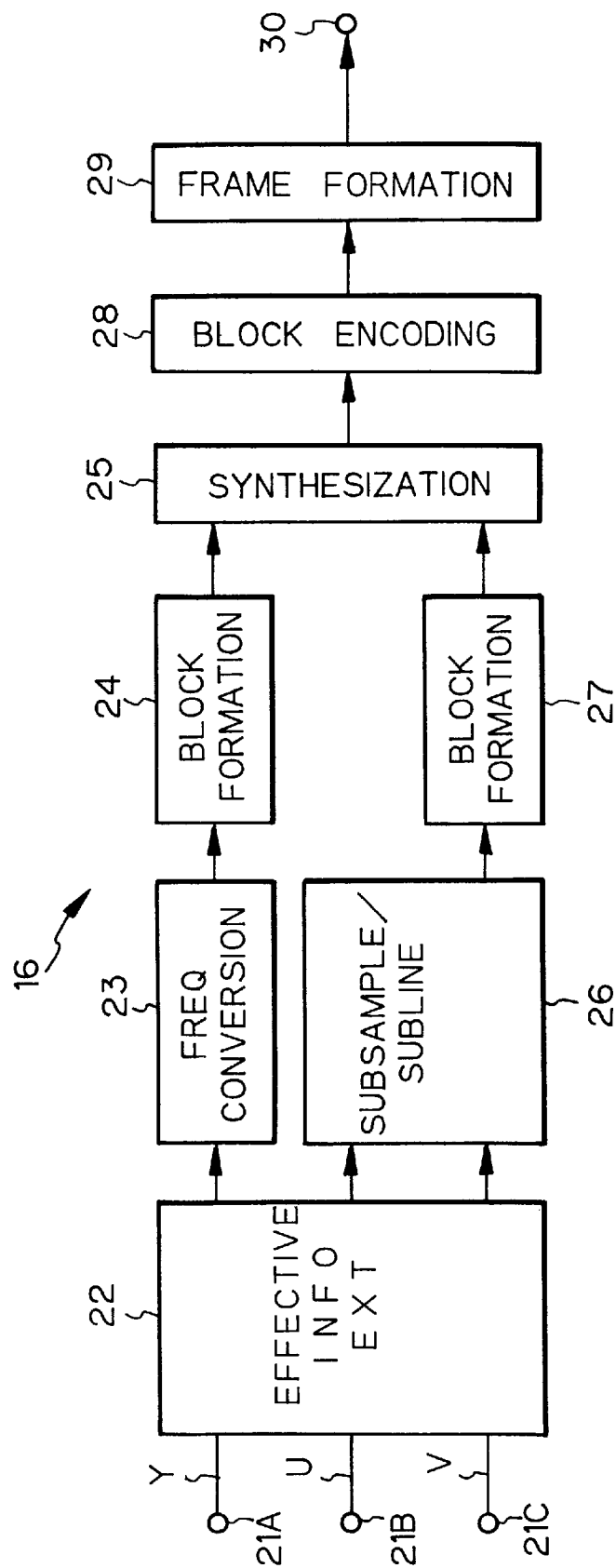
FIG. 5 is a detailed block diagram of a compressing circuit.

A detailed block diagram of the compressing circuit 16 is shown in FIG. 5. In FIG. 5, digital luminance data (Y) and digital color difference signals (U) and (V) which are formed from three primary color signals R, G, and B are supplied from input terminals 21A, 21B, and 21C. In this case, a clock rate of each data is set to 13.5 MHz or 6.75 MHz. The number of bits per sample is set to eight bits.

A data amount is compressed by an effective information extracting circuit 22 for extracting only information in effective areas by eliminating the data in the blanking period from the above data. The luminance data (Y) in an output of the effective information extracting circuit 22 is supplied to a frequency converting circuit 23, by which a sampling frequency is converted to a frequency of ¾ of 13.5 MHz. The frequency converting circuit 23 comprises, for example, a thin-out filter and is constructed so as not to cause an aliasing distortion. An output of the frequency converting circuit 23 is supplied to a block forming circuit 24, by which the order of the luminance data is converted to the order of blocks. The block forming circuit 24 converts the luminance data to a block structure of (8×8) pixels.

Two color difference data (U) and (V) in the output of the effective information extracting circuit 22 are supplied to a subsample and subline circuit 26, by which sampling frequencies are converted to the half of 6.75 MHz. After that, those data are alternately selected every line and synthesized to data of one channel. Thus, line-sequenced digital color difference data is outputted from the subsample and subline circuit 26.

Output data of the subsample and subline circuit 26 is converted to data of the order of blocks in a block forming circuit 27. The block forming circuit 27 converts the color difference data to the block structure of (8×8) pixels in a manner similar to the block forming circuit 24. Output data of the block forming circuits 24 and 27 is supplied to a synthesizing circuit 25.

In the synthesizing circuit 25, the luminance data (Y) and the color difference data (U) and (V) which were converted in accordance with the order of blocks are synthesized to the data of one channel. Output data of the synthesizing circuit 25 is supplied to a block encoding circuit 28. As a block encoding circuit 28, an encoding circuit (ADRC) which is adapted to a dynamic range of every block or a DTC circuit or the like can be applied. Output data of the block encoding circuit 28 is supplied to a frame forming circuit 29. In the frame forming circuit 29, a clock of the image system and a clock of the recording system are exchanged. An output of the frame forming circuit 29 is supplied to the interface 8 through an output terminal 30.

A detailed block diagram of the expanding circuit 17 is shown in FIG. 6.

In FIG. 6, the data which is outputted from the interface 8 is supplied to a frame decomposing circuit 32 though an input terminal 31. In the frame decomposing circuit 32, each component of the block encoding data of the video data is respectively decomposed and its output is supplied to a block decoding circuit 33. In the block decoding circuit 33, reconstructed data corresponding to the original data is decoded on a block unit basis.

The decoded output data of the block decoding circuit 33 is supplied to a distributing circuit 34 and is separated to the luminance data (Y) and the color difference data (U) and (V). The luminance data (Y) is supplied to a block decomposing circuit 35 and the color difference data (U) and (V) are supplied to a block decomposing circuit 38, respectively. In the block decomposing circuits 35 and 38, in a manner opposite to the block forming circuits 24 and 27 on the recording side, the decoded data of the order of blocks is sequentially converted to the data in accordance with the order of raster scan.

The decoded luminance data of the block decomposing circuit 35 is supplied to an interpolation filter 36. In the interpolation filter 36, the sampling rate of the luminance data (Y) is converted from 3 fs (fs denotes a color subcarrier frequency) to 4 fs (4 fs=13.5 MHz). The luminance data (Y) of the interpolation filter 36 is outputted to an output terminal 37A.

Output data of the color difference data (U) and (V) of the distributing circuit 34 are supplied to the block decomposing circuit 38 and is decomposed to the line-sequenced color difference data (U) and (V). The decomposed color difference data (U) and (V) are supplied to an interpolating circuit 40 through a distributing circuit 39. The color difference data (U) and (V) are respectively interpolated in the interpolating circuit 40. In detail, the interpolating circuit 40 interpolates the thinned-out pixel data by using the reconstructed video data. The digital color difference data (U) and (V) whose sampling rates are equal to 4 fs are supplied from the interpolating circuit 40 to output terminals 37B and 37C.

In case of recording the digital data by using the above-mentioned digital recording and reproducing apparatus, the data having a plurality of different recording rates are inputted. That is, the data is recorded at a recording rate of 49.896 Mbps in the HD recording mode. In the SD mode (variable speed recording mode), the video data of 24.948 Mbps is recorded in the video data area of the magnetic tape. A mode (hereinafter, referred to as a first long-time mode) to record at the half rate (12.474 Mbps) of that of the data recorded in case of using the SD mode or a mode to record the data compressed to various data rates in a range from about 1 Mbps to 10 Mbps is also considered.

Figure 1:
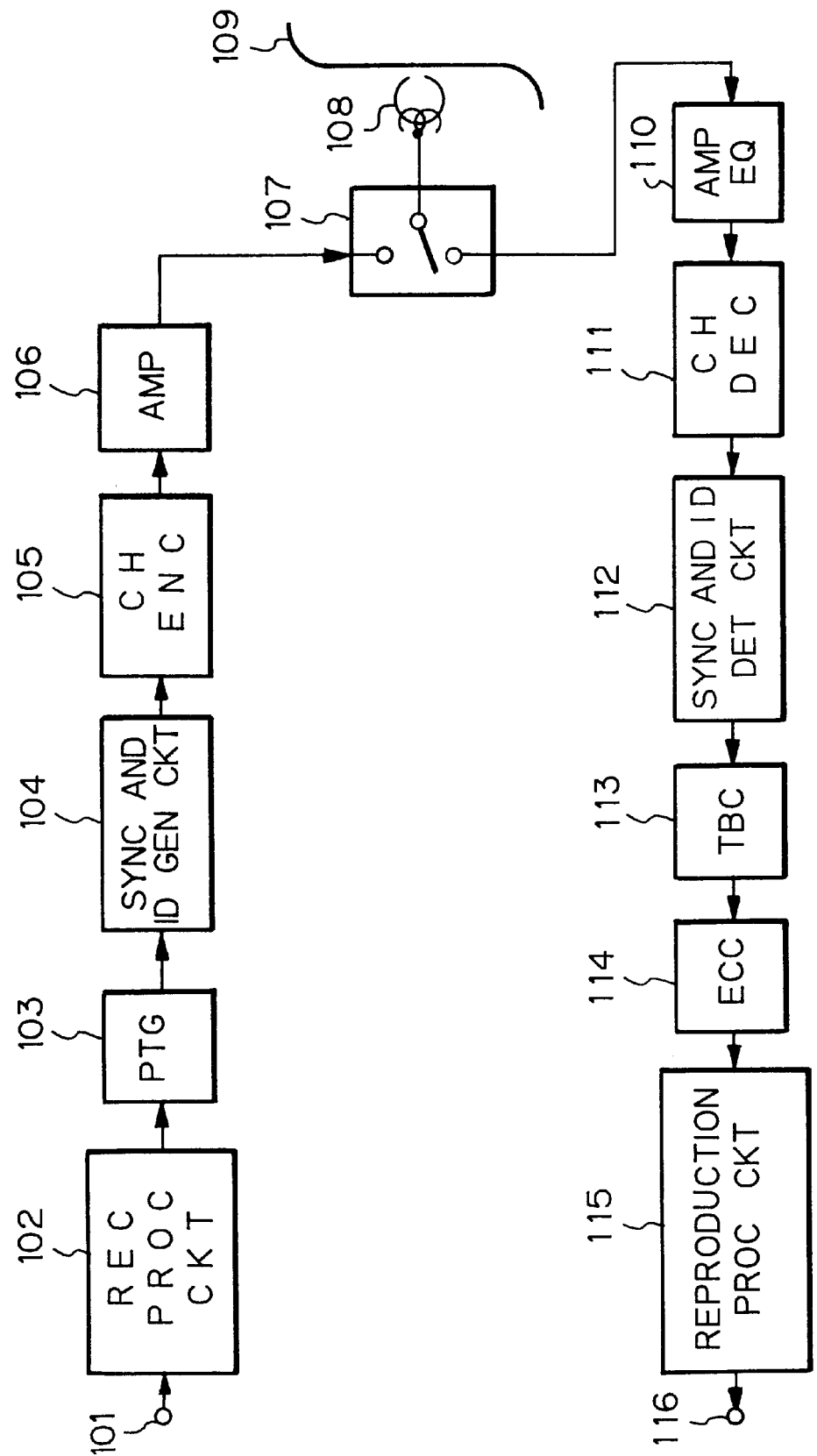
FIG. 1 is a block diagram of a digital recording and reproducing apparatus.
Figure 2:
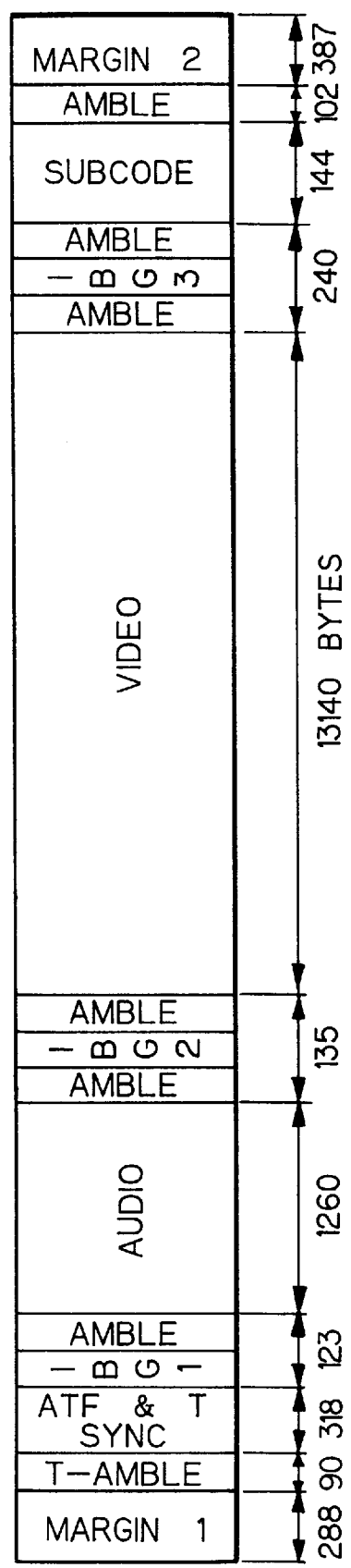
FIG. 2 is a diagram showing a tape format of the digital recording and reproducing apparatus.
Figure 3A:
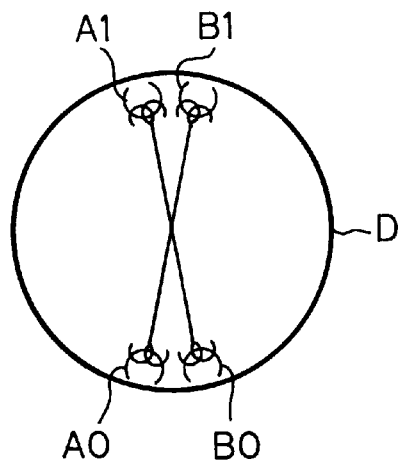
FIGS. 3A, 3B, and 3C are diagrams showing constructions of heads.

For the various modes as mentioned above, the running speed of the magnetic tape is controlled in correspondence to the input data rate and the data is recorded through the heads in the invention. Recording methods of data to the magnetic tape corresponding to those modes are shown in FIGS. 7A to 14C. In each of the recording methods of FIGS. 7A to 14C, the FIGS. 7A, 8A . . . 14A denote a head switching pulse. The digital data is recorded to the magnetic tape by the heads by the switching timing of the head switching pulse. The FIGS. 7B, 8B . . . 14B depict recording data of a head (A). The FIGS. 7C, 8C . . . 14C indicate recording data of a head (B). Hatched areas in FIGS. 7B, 7C, 8B, 8C . . . 14B, and 14C are areas in which no data is recorded. On the other hand, the data is recorded in the areas other than the hatched areas. It is now assumed that heads similar to those shown in FIG. 3A are used as magnetic heads to scan the magnetic tape.

FIGS. 7A, 7B and 7C are diagrams showing a recording method in the case where the video data supplied in the HD mode (recording rate of 49.896 Mbps) is recorded on the magnetic tape (assuming now that the tape speed in this instance is equal to 2X). In FIGS. 7A, 7B and 7C, data is recorded in the (A) and (B) channels in response to the H level and L level of each head switching pulse. As will be also obviously understood from the diagram, in the first H level interval of the head switching pulse, data A0 is recorded in the (A) channel by the head A0 and data B0 is recorded in the (B) channel by the head B0. In the first (L) level interval of the head switching pulse, the data A1 is recorded in the (A) channel by the head A1 and the data B1 is recorded in the (B) channel by the head B1, respectively. In the second (H) level interval of the head switching pulse, the data A0 is recorded in the (A) channel and the data B0 is recorded in the (B) channel, respectively. Thus, the data which is two times as large as the data in the SD mode can be recorded.

FIGS. 8A, 8B and 8C are diagrams showing a recording method in case of recording the video data supplied in the SD mode (recording rate of 24.948 Mbps) onto the magnetic tape (the tape speed in this instance is set to (X)). In FIGS. 8A, 8B and 8C, the data A0 is recorded in the (A) channel and the data B0 is recorded in the (B) channel, respectively, in the first (H) level interval of the head switching pulse. In the first (L) level interval of the head switching pulse, no data is recorded in the (A) and (B) channels. In the second (H) level interval of the head switching pulse, the data A0 is recorded in the (A) channel and the data B0 is recorded in the (B) channel, respectively.

FIGS. 9A, 9B and 9C show a recording method in case of recording the video data supplied in the first long-time mode (recording rate of 12.474 Mbps) onto the magnetic tape (the tape speed in this instance is set to X/2). In FIGS. 9A, 9B and 9C, the data A0 is recorded in the (A) channel and the data B0 is recorded in the (B) channel, respectively, in the first (H) level interval of the head switching pulse. No data is recorded in the (A) and (B) channels in the first (L) level interval, second (H) level interval, and second (L) level interval of the head switching pulse. In the third (H) level interval of the head switching pulse, the data A0 is recorded in the (A) channel and the data B0 is recorded in the (B) channel, respectively.

A recording method in case of recording the video data supplied in the second long-time mode (recording rate of 16.632 Mbps) onto the magnetic tape (the tape speed in this instance is set to 2X/3) is shown FIGS. 10A, 10B and 10C. In FIGS. 10A, 10B and 10C, the data A0 is recorded in the (A) channel and the data B0 is recorded in the (B) channel in the first (H) level interval of the head switching pulse. In the first (L) level interval and the second (H) level interval of the head switching pulse, no data is recorded in the (A) and (B) channels. In the subsequent second (L) level interval of the head switching pulse, the data A1 is recorded in the (A) channel and the data B1 is recorded in the (B) channel, respectively.

A recording method in case of recording the video data supplied in the third long-time mode (about 9.979 Mbps) onto the magnetic tape (the tape speed in this instance is set to 2X/5) is shown in FIGS. 11A, 11B and 11C. In FIGS. 11A, 11B and 11C, the data A0 is recorded in the (A) channel and the data B0 is recorded in the (B) channel in the first (H) level interval of the head switching pulse. In the first and second (L) level intervals and the second and third (H) level intervals of the head switching pulse, no data is recorded in the (A) and (B) channels. In the subsequent third (L) level interval of the head switching pulse, the data A1 is recorded in the (A) channel and the data B1 is recorded in the (B) channel, respectively.

A recording method in case of recording the video data supplied in the fourth long-time mode (8.316 Mbps) onto the magnetic tape (the tape speed in this instance is set to X/3) is shown in FIGS. 12A, 12B and 12C. In FIGS. 12A, 12B and 12C, the data A0 is recorded in the (A) channel and the data B0 is recorded in the (B) channel, respectively, in the first (H) level interval of the head switching pulse. On the other hand, in the first, second, and third (L) level intervals and the second and third (H) level intervals of the head switching pulse, no data is recorded in the (A) and (B) channels. The data A0 is recorded in the (A) channel and the data B0 is recorded in the (B) channel, respectively, in the fourth (H) level interval of the head switching pulse.

A recording method in case of recording the video data supplied in the fifth long-time mode (4.158 Mbps) onto the magnetic tape (the tape speed in this instance is set to X/6) is shown in FIGS. 13A, 13B and 13C. In FIGS. 13A, 13B and 13C, the data A0 is recorded in the (A) channel and the data B0 is recorded in the (B) channel in the first (H) level interval of the head switching pulse. In the first, second, third, fourth, fifth, and sixth (L) level intervals and the second, third, fourth, fifth, and sixth (H) level intervals of the head switching pulse, no data is recorded in the (A) and (B) channels. The data A0 is recorded in the (A) channel and the data B0 is recorded in the (B) channel, respectively, in the seventh (H) level interval of the head switching pulse.

A recording method in case of recording the video data supplied in the sixth long-time mode (7.128 Mbps) onto the magnetic tape (the tape speed in this instance is set to 2X/7) is shown in FIGS. 14A, 14B and 14C. In FIGS. 14A, 14B and 14C, the data A0 is recorded in the (A) channel and the data B0 is recorded in the (B) channel, respectively, in the first (H) level interval of the head switching pulse. In the first, second, and third (L) level intervals and the second, third, and fourth (H) level intervals of the head switching pulse, no data is recorded in the (A) and (B) channels. In the fourth (L) level interval of the head switching pulse, the data A1 is recorded in the (A) channel and the data B1 is recorded in the (B) channel, respectively.

Figure 16:
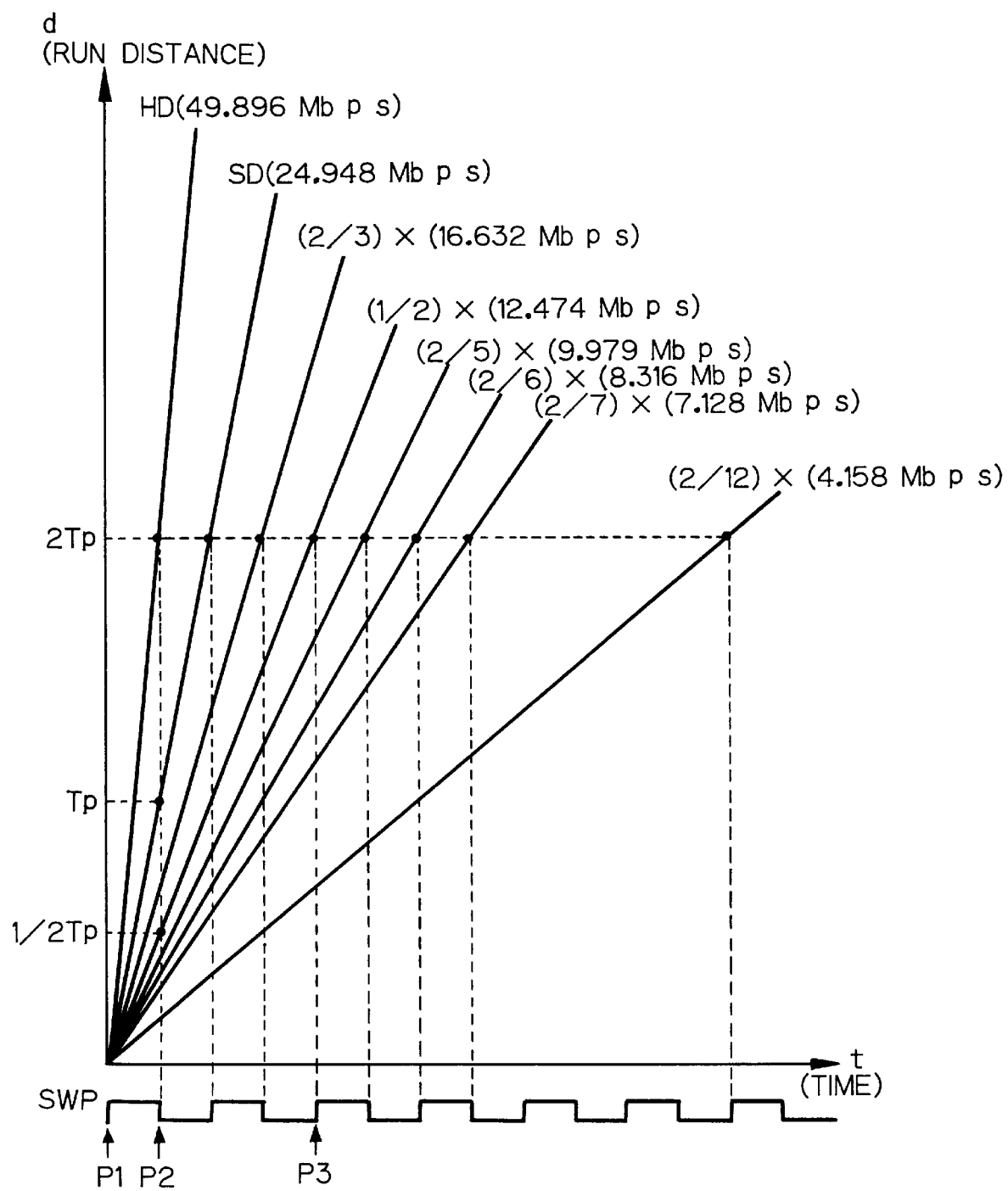
FIG. 16 is a diagram showing a time deviation of a run distance of the magnetic tape.

Even in the case where the video data is supplied at a plurality of different data rates, by intermittently recording at every predetermined period of the head switching pulse by setting the rotational speed of the drum to a standard value (for example, 9000 rpm) and by setting the tape running speed to v=V×R (V: normal tape speed; 18.8 mm/sec) in correspondence to the data rate ratio (R) (R=X/24.948 Mbps: X denotes a data rate of an input signal), the data can be recorded without effectively using excess magnetic tape unnecessarily. By the intermittent recording, the track format and data structure which are identical to those in case of the recording data of the standard rate can be used. A detailed explanation will be made by using FIGS. 15 and 16. FIG. 15 shows a positional relation between the magnetic heads and the tracks when the magnetic head approaches the magnetic tape in the first long-time mode (recording mode of 12.474 Mbps) explained in FIGS. 9A, 9B and 9C. In FIG. 16, an axis of abscissa denotes time (t) (corresponding to a head switching pulse SWP) and an axis of ordinate indicates a run distance (d) of the tape. A time deviation of the run distance of the tape in each case of the HD mode, SD mode, and the first to sixth long-time modes is shown. In FIG. 15, the magnetic tape is fed at 18.8×½=9.4 mm/sec. At a time point $P_1$ in FIG. 15, the magnetic head A0 is located at a position in which the lower edge of the head A0 coincides with the lower edge of a track $T_1$. In the first (H) interval, tracks $T_1$ and $T_2$ are formed. At a time point $P_2$, the lower edge of the magnetic head A1 is located at a position which is moved from the lower edge of the track $T_1$ only by ½ $T_p$ ($T_p$: track pitch). The recording cannot be performed at the time point $P_2$, since the head is located on the tracks $T_1$ and $T_2$ formed in the first (H) interval. The recording can be performed from a time point $P_3$, that is, when the lower edge of the A0 head is away from the lower edge of the track $T_1$ by $2T_p$. Therefore, the recording is performed by the magnetic heads A0 and B0 in the third (H) interval. Since the second to sixth long-time modes operate similarly, their descriptions are omitted here.

Although the running speed of the magnetic tape has been reduced and the recording has been performed in accordance with the above explanation, rather than feeding the magnetic tape at a low running speed corresponding to the recording, the tape can be also fed intermittently. That is, it is also possible to intermittently feed the magnetic tape to match the generating timing of the head switching pulse and to record the data only in the area which was intermittently fed (the areas other than the hatched areas in FIGS. 7A to 14C).

Figure 17:
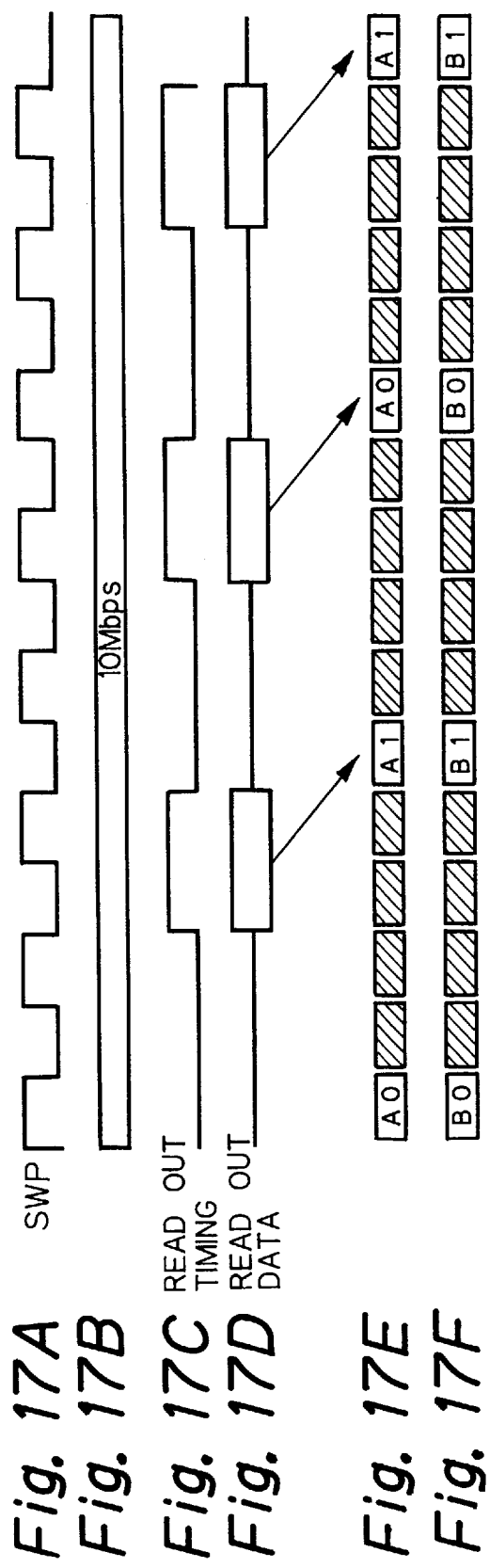
FIGS. 17A, 17B, 17C, 17D, 17E and 17F are diagrams showing recording timings.

In FIGS. 17A, 17B, 17C, 17D, 17E and 17F, the details of the recording timing by the recording heads in the third long-time mode [9.979 Mbps (recording rate), 2X/5 (tape speed)] are shown. In FIGS. 17A, 17B, 17C, 17D, 17E and 17F, the head which is used is switched by the head switching pulse shown in FIG. 17A. The data rate is set to, for example, 10 Mbps as shown in FIG. 17B and is stored into the buffer provided for the interface 7. An output of the interface 7 is supplied to the interface 8. In this instance, the data is supplied from the buffer to the interface 8 at a reading timing as shown in FIG. 17C. By such a reading timing, data as shown in FIG. 17D is read out. The data is recorded on the magnetic tape as shown in FIGS. 17E and 17F by a predetermined recording method (in this case, the tape speed of ⅖ of that in the normal recording). Information indicative of the data rate is supplied from the interface 7 to the interface 8. The data rate is equal to the standard data rate (25 Mbps) or a data rate other than the standard data rate.

According to the invention, when the digital data is supplied at a plurality of different data rates, the magnetic tape is intermittently fed or the tape speed is controlled in accordance with the input data rate. Thus, the magnetic tape can be used effectively. Therefore, the recording time of the magnetic tape can be increased.

An embodiment in which a verification whether the immediately preceding recording has been accurately performed or not is executed when the intermittent recording as mentioned above is performed will now be explained using FIG. 18.

Figure 3B:
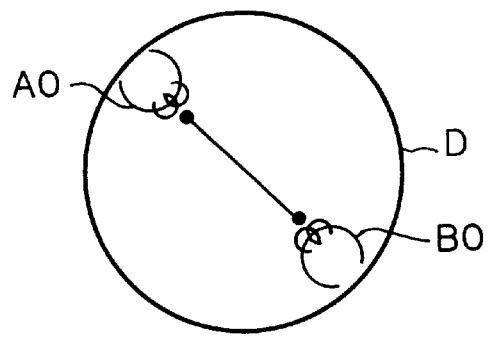
Figure 3C:
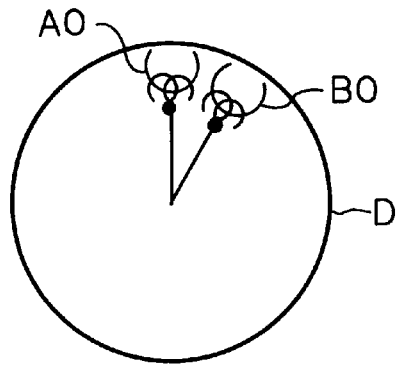

In the following description, as shown, for example, in FIG. 3B or 3C, a tape head mechanism such that the pair of heads A0 and B0 are attached at a facing interval of 180° and the magnetic tape is wound around the peripheral surface of the drum (D) with a wrap angle which is slightly larger than 180° is used. FIG. 18 shows a construction of one of the heads, for example, A0. Although not shown, a similar construction as that of FIG. 18 is also provided with respect to the other head B0.

Figure 18:
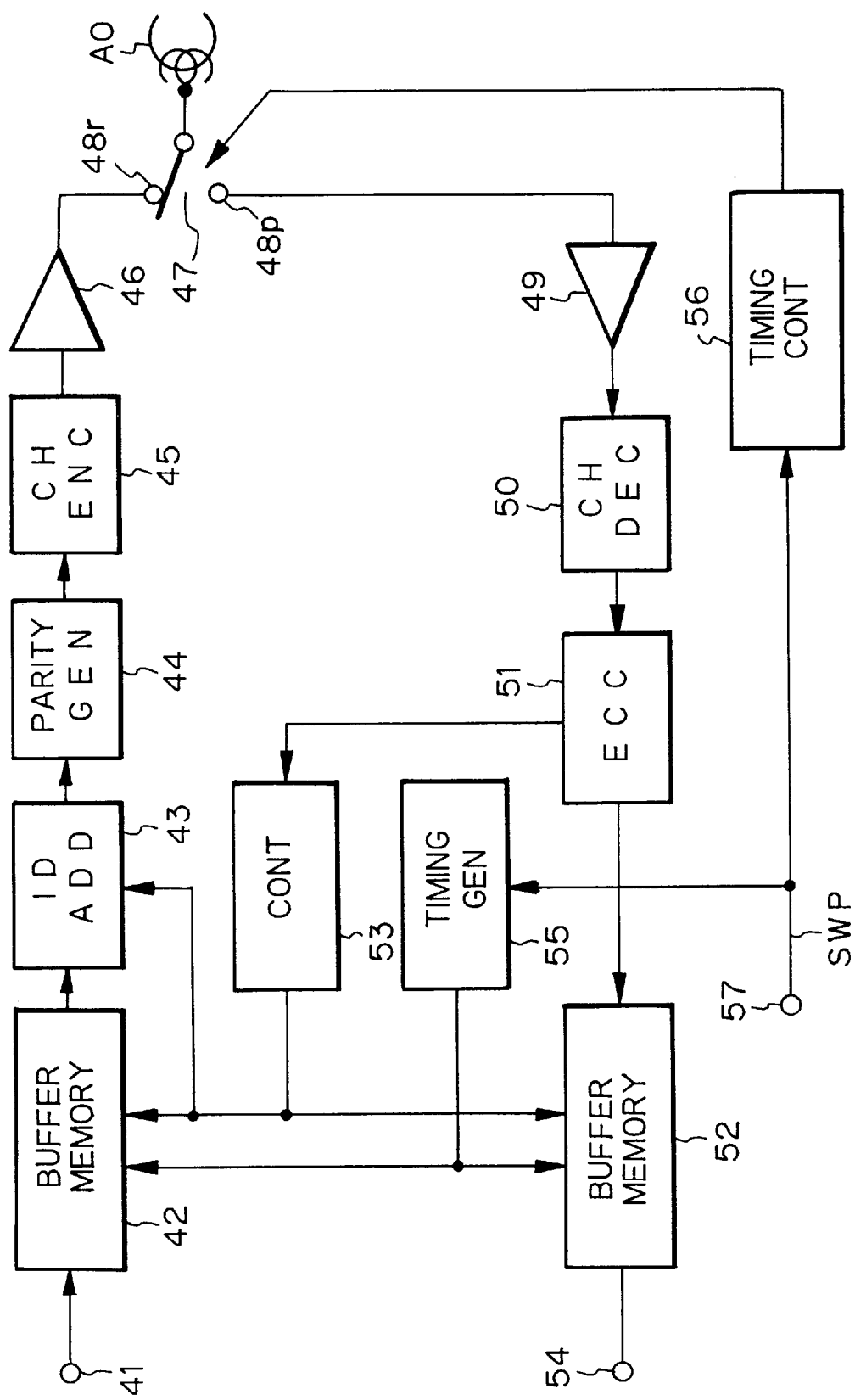
FIG. 18 is a block diagram of a digital recording and reproducing apparatus which verifies whether the immediately preceding recording has correctly been performed or not.

In FIG. 18, reference numeral 41 denotes an input terminal to which data to be recorded (general digital data, video data, audio data, or the like) is supplied. An input digital signal is written into a buffer memory 42. The input digital signal is intermittently read out from the buffer memory 42 in accordance with the rate ratio (R) of the recording data for the standard data rate. For instance, when the standard data rate is equal to 25 Mbps and the recording data rate is equal to 5 Mbps, the rate ratio (R)=⅕ and the digital signal which was time base compressed to about ⅕ is outputted from the buffer memory 42. Although the rate ratio (R) is fixed to the standard data rate (25 Mbps), a data rate other than the standard data rate can be also used. The output signal of the buffer memory 42 is supplied to an ID adding circuit 43. An ID indicating whether the data is the re-recorded data or not or the like is supplied to the ID adding circuit 43. A re-recording ID is added to the digital signal by the ID adding circuit 43 and the resultant digital signal is supplied to a parity forming circuit 44. The ID is recorded in an area for auxiliary data provided in the video area or audio area, a subcode area, or the like. The parity forming circuit 44 forms a parity of error correction code. As an error correction code, a product code or the like can be used. As compared with the error correction coding for the continuous data such as video data, an error correction coding having a stronger ability can be also used with respect to the general digital data.

The recording data from the parity forming circuit 44 is supplied to an encoder 45 of channel modulation and is channel modulated. An output signal of the channel modulating circuit 45 is supplied to the head A0 through a recording amplifier 46 and a recording side terminal 48r of a recording/reproduction change-over switch 47. The output signal is recorded as an oblique track on the magnetic tape by the head A0. As for the data rate, an attention is paid to the data rate of the recording data between the parity forming circuit 44 and the channel modulating circuit 45. In case of the standard data rate, the rate of the data to which an attention is paid is equal to 25 Mbps. For example, in case of the rate ratio R=⅕, it is equal to 5 Mbps.

The reproduction signal from the head A0 is supplied to a decoder 50 of channel modulation through a reproducing side terminal 48p of the recording/reproduction change-over switch 47 and a reproducing amplifier 49. A demodulated output of the decoder 50 of channel modulation is supplied to an error correcting circuit 51. The error correcting circuit 51 corrects errors which occurred in the recording and reproducing steps. An output signal of the error correcting circuit 51 is written into a buffer memory 52. A verification result PB-OK of the reproduction signal is generated from the error correcting circuit 51 and is supplied to a controller 53. As will be described hereinlater, the immediately previously recorded digital signal is reproduced and is verified whether the recording has been accurately performed or not and the PB-OK holds the verification result.

The buffer memory 52 is provided for a rate conversion of the reproduction digital signal and executes the time base expansion in a manner opposite to the case of the recording mode. The ratio of the expansion is set according to the rate ratio (R). The reproduction signal of the original data rate is read out from the buffer memory 52 and is supplied to an output terminal 54. A timing forming circuit 55 and a timing controller 56 are also provided and an RF switching pulse SWP is supplied from an input terminal 57 to those circuits 55 and 56.

The RF switching pulse SWP is a pulse signal which is synchronized with the rotation of the rotary head. Assuming that a rotational frequency of the drum to which the heads are attached is equal to (F), the RF switching pulse SWP has a period (t) of 1/F. For example, the head A0 traces the magnetic tape in a period during which the pulse SWP is at the high level and the head B0 traces the magnetic tape in a period during which the pulse SWP is at the low level. The timing forming circuit 55 controls the writing and reading operations to/from the buffer memories 42 and 52 synchronously with the trace of the heads. The timing controller 56 controls the recording/reproduction change-over switch 47 of the head A0 and a recording/reproduction change over switch of the head B0 (not shown) synchronously with the trace of the heads.

The intermittent recording operation will be explained with reference to FIGS. 19A, 19B, 19C, 19D and 19E. The RF switching pulse SWP has the period (t) of $\frac{1}{150}$ (second) when the rotational speed of the drum (D) is equal to 9000 rpm. The head A0 traces the magnetic tape in the period during which the pulse SWP is at the high level and the head B0 traces the magnetic tape in the period during which the pulse SWP is at the low level. For instance, in the case where the rate ratio is equal to $\frac{1}{15}$, the RecEN (recording enable) is made active in the period during which the head A0 traces, after the elapse of a period of 7.5 (t) since a pulse RecEN is made active (high level) to allow the recording operation to be executed. In a period during which the RecEN is active, the recording of one track is performed. When the denominator of the rate ratio (R) is an odd number, as will be obviously understood from the above-mentioned example, the heads A0 and B0 alternately perform the recording operation, thereby recording the neighboring tracks at different azimuths.

The reproduction signal from the head which has performed the recording just before is extracted in the period during which a PB (reproduction pulse) shown in FIG. 19C, is at the high level. Such recording and reproducing operations can be realized by controlling the recording amplifier 46 by the pulse signal RecEN and by controlling the recording/reproduction change-over switch 47 and reproduction amplifier 49 by the PB. In FIG. 19E, a recording current flowing in the head and the reproduction signal are partially enlarged.

Figure 22:
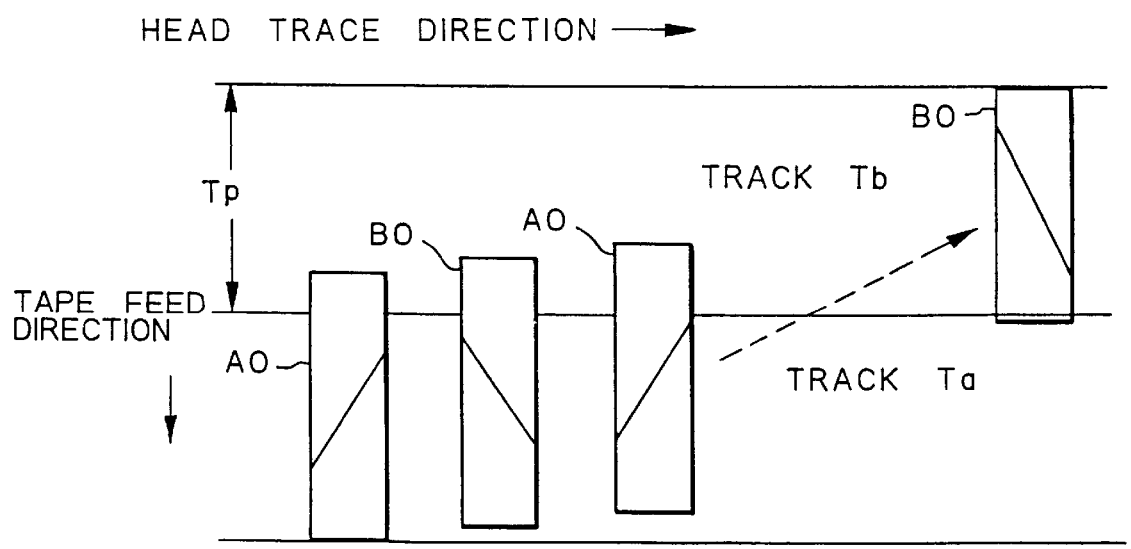
FIG. 22 is a diagram showing a positional relation between the magnetic heads and the tracks of the magnetic tape.

A case of the intermittent recording where the magnetic head performs the recording once for every 15 scans (when the track pitch $T_p$ is equal to 10 $\mu$m) is shown in FIG. 22. It is now assumed that the construction of the magnetic head is similar to that shown in FIG. 3B or 3C in this case. FIG. 22 shows parts of the neighboring tracks Ta and Tb. The track Ta is recorded at an azimuth corresponding to the azimuth angle of the head A0 and the track Tb is recorded at an azimuth corresponding to that of the head B0. In this instance, the track pitch $T_p$ is set to 10 $\mu$m. First, the recording is performed to the track Ta by the head A0. Subsequently, the head B0 traces the position which is advanced by ($T_p/15$=0.667 $\mu$m) by using the track Ta as a reference. The head A0 traces the position which is advanced by ($2T_p/15$). After completion of the fifteen traces since the track Ta had been recorded, the next recording is executed when the head B0 traces the track Tb.

As mentioned above, in the case where the track pitch is equal to 10 $\mu$m, for example, the head A0 records the recording data and the head A0 traces the track to which the recording has been performed just before to a position which is advanced by 0.667 $\mu$m. Therefore, as compared with the case of the just on-track having no track deviation, a deviation of 0.667 $\mu$m×2=1.333 $\mu$m occurs. Assuming a C/N ratio of the just on-track is equal to 0 dB, the C/N ratio of the reproduction signal which is obtained by the next trace of the recording operation is equal to −1.24 dB. As compared with the case of the just on-track, there is no large deterioration. The verification whether the recording has been correctly performed or not is executed by using the reproduction signal.

Referring to FIGS. 20A, 20B, 20C, 20D, 20E and 20F, the verification of the recording operation will be explained. According to the recording operation, the RecEN is set to the high level according to the rate ratio, for example, every 7.5 (t) and the data is recorded during this period of time. It is now assumed that data which is recorded by the head A0 is set to data 1 and data recorded by the head B0 is set to data 2. The data 1 is reproduced by the head A0 and is supplied to the error correcting circuit 51 through the reproduction amplifier 49 and decoder 50 of the channel modulation.

The errors of the reproduced data 1 are corrected in the error correcting circuit 51 and the verification result PB-OK is generated depending on whether the errors which cannot be corrected remain or not. The verification result PB-OK at the high level means that the recording has been correctly performed. The verification result PB-OK at the low level means that the recording has failed. In this case, the verification can be also executed by collating the recording data and the reproduction data. Even when the errors can be corrected, it is also possible to treat the recording as a failed recording when the amount of errors is equal to or larger than a predetermined amount. The verification result PB-OK is supplied to the controller 53.

In FIGS. 20A, 20B, 20C, 20D, 20E and 20F, a case where the PB-OK is set to the high level with respect to the data 1 and a case where the PB-OK isn't set to the high level are shown. In the case where the PB-OK is at the high level as shown in FIG. 20D, new recording data is recorded as data 2 subsequent to the data 1. On the other hand, when the PB-OK after the recording of the data 1 is at the low level as depicted in FIG. 20F, since it means that the recording of the data 1 has failed, the same data as the data 1 is re-recorded as data 2. The controller 53 controls buffer memory 42 so that the previous recorded data is outputted. Simultaneously, the controller 53 generates an ID indicating that the data is the re-recorded data. This ID is added to the data 2 to be re-recorded by the ID adding circuit 43. If an ID indicative of the re-recorded data is present, the data of the previous track of the re-recorded data is handled as invalid during the reproducing operation. In this case, it is possible to effectively use the corrected data in place of the data of the previous track.

It is also possible to distinguish the continuous data such as video or audio data from the discontinuous data such as data of a computer program and to verify as mentioned above with respect to only the general data. More specifically, an ID indicative of the kind of recording data is supplied to the timing controller 56 and only when the recording data is the general digital data, the recording/reproduction change-over switch 47 is controlled so as to select the terminal 48p on the reproduction side only for a predetermined period. The ID indicative of the kind of data can be supplied as input by the user, by the system controller, transmission from a broadcasting station in case of the digital CATV, or the like.

Figure 21:
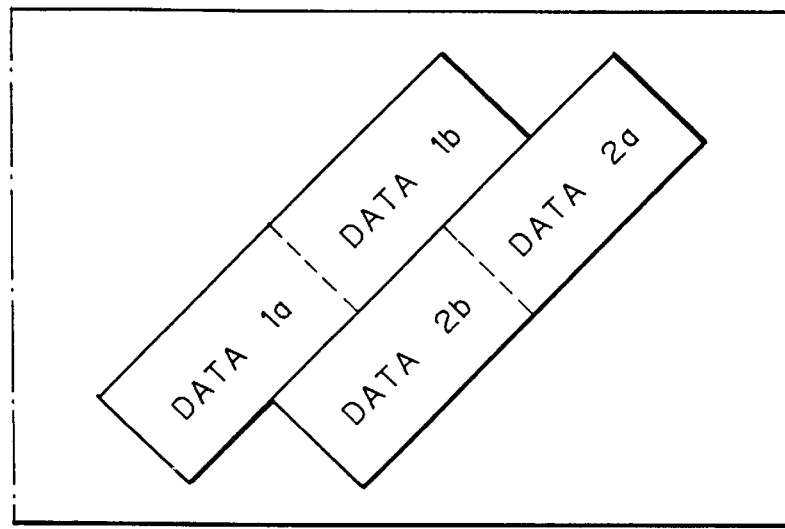
FIG. 21 is a diagram showing an arrangement order of data upon re-recording.

Further, as shown in FIG. 21, the order of the data can be also made different among the neighboring tracks when the re-recording is performed. That is, the data 1 to be first recorded is divided into two equal portions and a half portion 1a is recorded in the former half of the track and another half portion 1b is recorded in the latter half of the track. When re-recording the same data, a half portion 2b (this is the same data as 1b) of the re-recorded data is recorded in the former half of the track and another half portion 2a (this is the same data as 1a) is recorded in the latter half of the track.

By exchanging the order of the recording data in the longitudinal direction of the track as mentioned above, a possibility such that both the data 1 and 2 become error data by a scratch in the longitudinal direction of the tape is greatly reduced. Namely, even when the data 1a and 2b become erroneous due to a scratch on the lower side of the tape, the correct data can be obtained by combining the data 1b and 2a. The division is not limited to that of FIG. 21 and the division of a larger number is also possible.

In the above-mentioned embodiment, the same data has been re-recorded when the first recording has failed. However, the invention isn't limited to such a case but it is also possible to generate an alarm indicating that the recording has failed. The reproducing operation to verify immediately proceeding recording is not limited in the trace period of the head just after the recording. If a necessary C/N ratio can be assured, the reproducing operation can be also executed in the subsequent trace period until the next recording period.

According to the invention, since the verification of the recording is performed by using the recording stop period when the intermittent recording is executed in order to record the recording data having a data rate which is lower than the standard data rate, the same heads as the recording heads can be used. There is no need to use other heads different from the recording heads, so that there is an advantage such that the construction is simple.

We claim:

1. A recording and reproducing apparatus for intermittently recording externally supplied digital data on a magnetic tape at every predetermined period of a head switching pulse with at least a pair of rotary heads having different azimuth angles, said externally supplied digital data selectively exhibiting at least two data rates whose data rate ratios vary and are not fixed, comprising:

means for feeding said magnetic tape continuously so as to record said externally supplied digital data onto said magnetic tape at a record timing or reproduce recorded externally supplied data from said magnetic tape;

recording timing control means for controlling the rotating speed of said rotary heads so as to selectively record said externally supplied digital data having a first data rate at a first record timing or reproduce said recorded externally supplied digital data from said magnetic tape whereby the relationship of the relative speed between said rotary heads and said magnetic tape is kept constant when said magnetic tape is being fed by said feeding means and the same track pattern is recorded on said magnetic tape regardless of the data rate ratio;

memory means for temporarily storing said externally supplied digital data prior to recording thereof; and reading means for reading said externally supplied digital data stored in said memory means.

2. A recording and reproducing apparatus according to claim 1, wherein said digital data is an image audio signal.

3. A recording and reproducing apparatus according to claim 1, wherein when said second data rate is smaller than said first data rate, said recording timing control means is operable to control the recording timing so as to provide a recording stop period during which recording is not performed even when said rotary heads scan said magnetic tape.

4. A recording and reproducing apparatus according to claim 3, further including recording verifying means for reproducing during said recording stop period just-recorded digital data using one of said rotary heads having the same azimuth angle as the one used to record said digital data and for verifying the accuracy of said recording by analyzing said reproduced digital data.

5. A recording and reproducing apparatus according to claim 4, wherein said recording verifying means is operable to re-record said digital data together with an update flag onto said magnetic tape when initial recording of said digital data is verified as a failure by said verifying means.

6. A recording and reproducing apparatus according to claim 5, further including reproducing means for reproducing said digital data stored on said magnetic tape to provide current digital data;

storage means for temporarily storing a previously reproduced digital data;

detecting means for detecting said update flag in said current digital data;

invalidating means responsive to said detected update flag for invalidating said stored previously reproduced digital data and for causing said storage means to store said current digital data; and output means for outputting the digital data stored in said storage means for further processing.

7. A recording and reproducing apparatus according to claim 6, further comprising recording means for recording said digital data in a predetermined sequence onto a track of said magnetic tape and wherein said recording verifying means re-records said digital data onto a different track of said magnetic tape in a sequence that is different from said recording means.

8. A recording and reproducing method for intermittently recording externally supplied digital data on a magnetic tape at every predetermined period of a head switching pulse with at least a pair of rotary heads having different azimuth angles, said externally supplied digital data selectively exhibiting at least two data rates whose data rate ratios vary and are not fixed, said method comprising the steps of:

feeding said magnetic tape continuously so as to record said externally supplied digital data onto said magnetic tape at a record timing or reproduce recorded externally supplied digital data from said magnetic tape;

controlling the rotating speed of said rotary heads so as to selectively record said externally supplied digital data having a first data rate at a first record timing or reproduce said recorded externally supplied digital data from said magnetic tape whereby the relationship of the relative speed between said rotary heads and said magnetic tape is kept constant when said magnetic tape is being fed and the same track pattern is recorded on said magnetic tape regardless of the data rate ratios;

temporarily storing said externally supplied digital data prior to recording thereof; and reading said externally supplied digital data stored in said memory means.

9. A recording and reproducing method according to claim 8, wherein said digital data is combined image and audio data.

10. A recording and reproducing method according to claim 8, wherein when said second data rate is less than said first data rate, said recording timing is controlled so that a recording stop period during which recording is not performed even when said rotary heads scan said magnetic tape is provided.

11. A recording and reproducing method according to claim 10, further comprising the steps of reproducing during said recording stop period just-recorded digital data using one of said rotary heads having the same azimuth angle as the one used to record said digital data and verifying the accuracy of said recording by analyzing said reproduced digital data.

12. A recording and reproducing method according to claim 11, wherein the accuracy of said recording is verified by re-recording said digital data together with an update flag onto said magnetic tape when initial recording of said digital data is verified as a failure.

13. A recording and reproducing method according to claim 12, further comprising the steps of reproducing said digital data stored on said magnetic tape to provide current digital data;

temporarily storing a previously reproduced digital data;

detecting said update flag in said current digital data;

invalidating said stored previously reproduced digital data and temporarily storing said current digital data in response to said detected update flag; and outputting the stored digital data for further processing.

14. A recording and reproducing method according to claim 13, further comprising the step of recording said digital data in a predetermined sequence onto a track of said magnetic tape and wherein said verifying step re-records said digital data onto a different track of said magnetic tape in a sequence that is different from said recording.

* * * * *